C. W. FREES.
HAND WEEDER.
APPLICATION FILED SEPT. 20, 1915.
1,187,615.
Patented June 20, 1916.
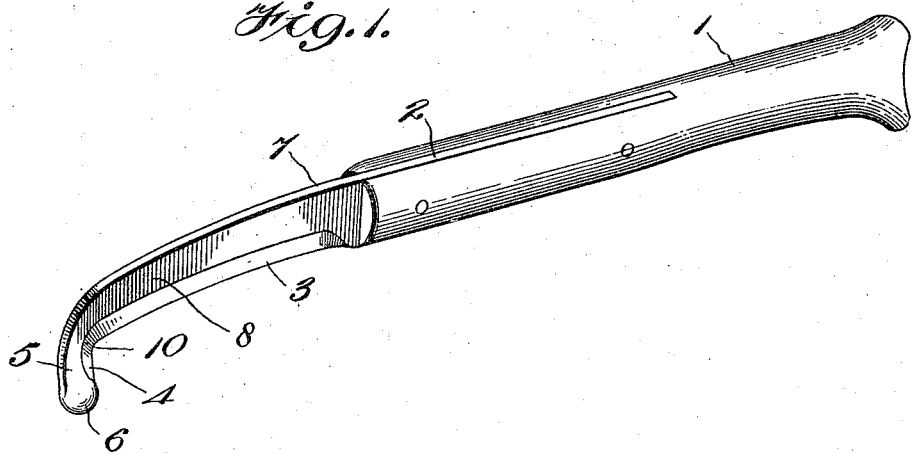
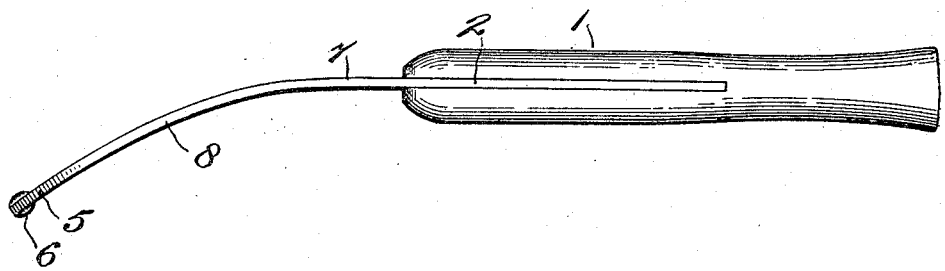
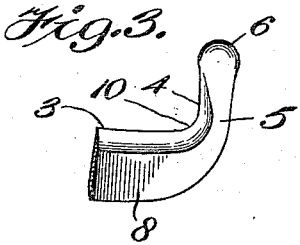

UNITED STATES PATENT OFFICE.

CHARLES WILLIAM FREES, OF PIQUA, OHIO.

HAND-WEEDER.

1,187,615.　　　　　Specification of Letters Patent.　　Patented June 20, 1916.

Application filed September 20, 1915.　Serial No. 51,652.

*To all whom it may concern:*

Be it known that I, CHARLES WILLIAM FREES, a citizen of the United States, residing at Piqua, in the county of Miami and State of Ohio, have invented certain new and useful Improvements in Hand-Weeders; and I do hereby declare the following to be a full, clear, and exact description of the invention, such as will enable others skilled in the art to which it appertains to make and use the same.

This invention relates to hand weeders, especially adapted for pulling up, cutting and destroying weeds and other growths around young plants and has for its object to provide an instrument of this character which will be inexpensive to manufacture and more efficient in action than those which have been heretofore proposed.

With these and other objects in view the invention consists in the novel details of construction and combinations of parts, more fully hereinafter disclosed and particularly pointed out in the claim.

Referring to the accompanying drawings forming a part of this specification, in which like numerals designate like parts in all the views Figure 1 is a perspective view of a hand weeder made in accordance with my invention; Fig. 2 is a top plan view of the parts shown in Fig. 1; and Fig. 3 is an enlarged detail view showing the construction of the extreme turned over point of the weeder.

1 indicates any suitable handle, 2 a blade secured to said handle, 3 a cutting edge for said blade, which is curved or bent as shown at 4, to follow the curved or bent over end portion 5 of the blade. The extreme point 6 of the hand weeder is preferably blunted or rounded off as shown, so that it will not cut or destroy the roots of the plants when it is not the intention of the operator to do so.

The main body portion of the blade 2 is provided with a comparatively straight portion 7 next to the handle 1 and then with a curved or decidedly bent portion 8, which joins the hooked or bent over end portion 5 of the blade. In other words, it will be observed that the hooked portion 5 is an integral part of the bent portion 8, but that it extends in a direction substantially at right angles to the back of said bent portion 8.

In the operation of the hand weeder, owing to the decidedly bent portion 8, which causes the handle 1 to make an angle of say thirty or forty-five degrees with the plane of the bent over portion 5, the said handle 1 may be grasped by the hand and held well up above the ground, entirely out of the way of any mud or other dirt with which the hand would otherwise come into contact, while the said portion 5, lies on its flat side and is inserted beneath the surface of the soil. When the portion 5 is thus buried in the soil and the hand thus protected from contamination therewith, the extreme and blunt point 6 is easily so manipulated as not to cut or destroy any roots or stalks it is desired to preserve, while on the other hand, the sharpened edge portion 4 is readily brought into contact with any roots or stalks that it is desired to cut, and by pulling on the handle 1 the said edge portion 4 readily severs such stalks or roots it is desired to destroy. In addition to this, the corner 10 between the edges 3 and 4 readily engages said roots or stalks and enables the operator to either pull them up or to easily sever the same. The engagement of the corner 10 with the roots or stalks it is desired to destroy, is of great advantage in those cases where said roots or stalks are too large to readily cut. In other words, in the case of a large and tough root for example, the sharpened corner 10 readily enters said root, thus giving a firm hold of the knife thereon, and by pulling steadily on the handle 1, the said root can either be pulled up or else it will be effectually severed. The sharpened edge portion 3 is useful in cutting roots or stalks by a sweeping lateral motion of the knife and which do not require the careful discrimination to select that is required when the portion 5 is employed. When thus using the edge 3 the handle 1 will be only slightly inclined to the surface of the soil and the portion 5 will be raised up above the cutting portion of the edge 3, so that a sort of scooping action is had. It is in order to permit of this scooping action that the straight portion 7 is provided. It will thus be seen that by the simple expedient of blunting the extreme portion 6 of the bent over portion 5 of the blade 2, and by curving the portion 8 of the blade in a plane different from the straight portion 7, I have provided a hand weeder which is capable of a large variety of uses and which at all times enables the operator to prevent the soiling of his hands.

What I claim is:

A hand weeder comprising a handle; a blade attached to and provided with a straight portion next to said handle; said blade provided with a bent portion joining said straight portion; said bent portion provided with a hook portion in substantially the same plane as said bent portion; said hook portion extending at an angle to the back of said bent portion and provided with a blunted point at its extreme end; said straight and bent portions provided with sharpened edges joining each other; and said hook portion provided with a sharpened edge joining at substantially a right angle, the sharpened edge of said bent portion to form a sharpened corner; substantially as described.

In testimony whereof I affix my signature, in presence of two witnesses.

CHARLES WILLIAM FREES.

Witnesses:
 CLYDE G. CARR,
 LOSH O. HARBAUGH.

Copies of this patent may be obtained for five cents each, by addressing the "Commissioner of Patents, Washington, D. C."